June 28, 1938.   C. J. F. WESTMAN   2,122,166
SHIP'S SIDE LIGHT
Filed Feb. 10, 1937
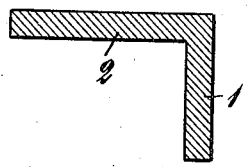
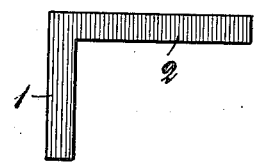
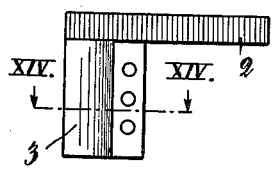
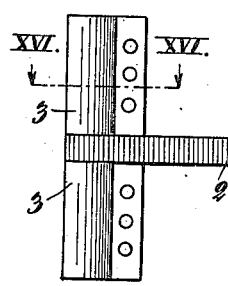
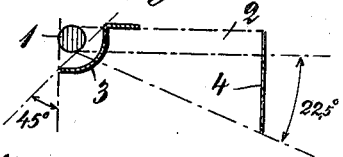
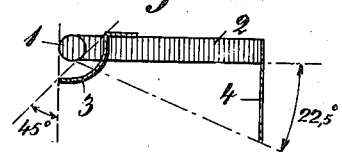
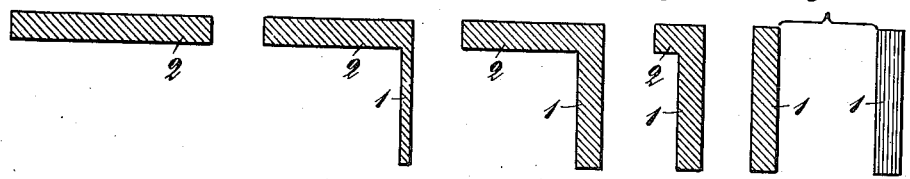
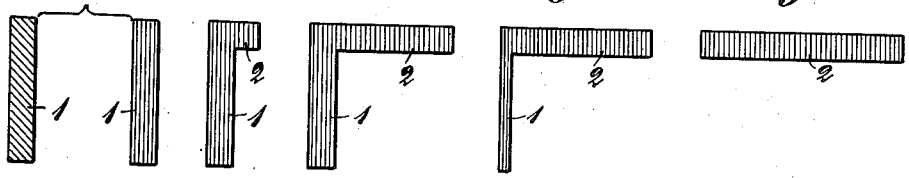
INVENTOR:
CARL JOHAN FREDRIK WESTMAN
BY Haseltine, Lake & Co.
ATTORNEYS Patented June 28, 1938

2,122,166

UNITED STATES PATENT OFFICE 2,122,166

SHIP'S SIDE-LIGHT

Carl Johan Fredrik Westman, Stockholm, Sweden

Application February 10, 1937, Serial No. 125,008
In Sweden February 12, 1936

2 Claims. (Cl. 240—7.5)

In accordance with international law ships under way, whether propelled by machinery or under sail, shall carry after sunset two sidelanterns, green on the starboard side and red on the port side, placed in such a way that each light is visible uninterruptedly over 10 points of the compass or 112.°5 forward. The source of light may simply be an oil-lamp or, as is nowadays most usual, an electric lamp. This source of light therefore becomes what might be called a spot-light.

To avoid collision between ships at sea certain regulations are in force in reference to the duty of the one ship or the other to give way. The mutual position between the vessels and their course are the factors which first and foremost determine the master's duty to make the necessary maneuver for avoiding collision.

At night—and chiefly in the case of sailingvessels which only carry side-lights in contradistinction to machine-driven vessels which in addition carry amidships an elevated white light—a master can, in order to judge the other vessel's position and course as a matter of fact only reckon with the side-lights as a guide. Only one of these lights is visible at one and the same time except in those cases where ships meet stem on when both side-lights are visible simultaneously. In view of the side-lights being in the nature of unchangeable spot-lights a master can thus only determine the course of the other ship within 10 points (112.°5). Moreover it should be noted that as long as ships are not compelled to carry a fixed white stern-light they are liable to be overtaken and run into in any position whatsoever within a sector of no less than 12 points (135°), i. e., 6 points (67.°5) on either side from astern. In view of the great differences that exist between the speed of present-day ships—a condition of affairs that in the near future will probably be still more felt—this appears a factor of very serious importance and a contingency against which present-day legislation is not a sufficient safeguard. It is obvious that these circumstances—the character of the side-lights as unalterable spot-lights and the great variations in the speed of ships—contribute towards a state of uncertainty which jeopardizes safety at sea.

The aim and object of the present invention is by means of a new arrangement and device of the side-lights to eliminate this uncertainty and instead to enable a master to determine immediately and almost precisely the position of another ship and to follow any possible alterations of its course. For this purpose angularly disposed elongated lights, e. g., neon-lights, are substituted for the present-day system of lights while at the same time the green and red colours for the starboard and port sides respectively are retained.

The invention will now be more particularly described with reference to the accompanying drawing, where Figs. I and II represent a sideview of the starboard and port light respectively, unscreened, Fig. III a side-view of the port light with the vertical shank screened off, and Figs. IV–XIII are diagrammatic representations of the relation of the side-lights while the ship is swung round to starboard. Fig. XIV illustrates a crosssection according to the line XIV—XIV in Fig. III. Fig. XV is a somewhat modified arrangement and Fig. XVI is a cross-section according to the line XVI—XVI in Fig. XV.

In the preferred embodiment each light is arranged in the form of a right angle with a shorter vertical shank 1 forward and pointing downwards, and a longer horizontal shank 2, Figs. I and II. The vertical shank 1 may, however, just as well point upwards. For reasons that will be more fully dealt with hereinafter the length of the vertical shank 1 will be 71% of that of the horizontal one 2. Otherwise the size of the whole light may vary, but it seems that at least in a certain measure, it should preferably be adapted to the size of the ship. From a line alongside, and immediately behind, the vertical shank 1, a more or less curved screen 3 of some suitable stout material projects, Figs. III and XIV. This screen is sufficiently curved forwards to cause the light from the vertical shank 1 to become entirely shut off when viewed through the aft 90°-sector reckoned from the anterior edge of the shank. When viewed through the anterior 90°-sector the vertical shank 1 will gradually emerge through the first 45° (next to abeam), then to become wholly visible and remain so through the anterior 45°. Moreover at 45° the two shanks 1 and 2 will appear to be of exactly the same length because of their relative size of 71:100.

In order to explain the different phases through which the two side-lights of a vessel pass, according to the present invention from the point of view of a stationary observer, we may assume that a ship, from its initial position with its starboard side turned straight towards the observer, is swung round 360° to starboard. With reference to Figs. IV–XIII, which are meant to illustrate diagrammatically the relations of the side-lights during such continuous turning, we shall then find that at the initial position, Fig.

IV, the entire green horizontal light 2 is alone visible. As the vessel now slowly swings to starboard the vertical shank 1 soon becomes gradually visible while at the same time the horizontal shank 2 gradually seems to grow shorter, Fig. V. By and by the vertical shank 1 becomes visible more and more distinctly, while at the same time the shortening of the horizontal shank 2 continues until both appear to be of equal length and of the same brightness, Fig. VI. As stated in the preceding this takes place when the ship is at an angle of 45° to the observer on account of the relative length of the shanks 1, 2 being at the ratio of 71:100. If the turning movement is continued the vertical shank 1 retains its full force of light and the horizontal one 2 grows still shorter, Fig. VII. Gradually this shank 2 disappears altogether as an elongated light and the vertical shank 1 alone remains visible on the starboard side.

But by that time the ship has reached a position in which the stem points almost straight at the observer, and shortly after the vertical red shank 1 on the port side will also be visible. With the stem pointing straight at the observer both the green and red vertical lights will thus be visible simultaneously, Figs. VIII and IX. If the turning movement to starboard is again continued we soon find how the green light entirely disappears and how the horizontal shank 2 of the red port light begins to become visible, Fig. X. The red light will then, though in a reverse order, pass through exactly the same phases as have just been described in respect of the green light as shown in Figs. XI–XII, until the vessel's port side is abeam of the observer, Fig. XIII. In this position only the red horizontal shank 2 is then visible in its entire length. As the vessel's stem then turns more and more away from the observer, the horizontal shank 2 of the red light apparently gradually shortens until it disappears entirely, this being due to a screen 4 fitted up immediately behind this shank 2, compare Figs. III and XIV, and Figs. XV–XVI. This screen might be constructed in such a way in regard to length and position that it will shut off the horizontal shank 2 at 2 points (22.°5) from astern.

Since a similar screening arrangement exists on the other side, the ship, at any rate in so far as the side-lights are concerned, will on continued turning show a dark sector of 45° before the horizontal shank 2 of the green light again begins to become visible. This green horizontal shank 2 then gradually apparently grows in size until its whole length becomes visible on the ship resuming its original position with its starboard side abeam the observer. Since in practice—though not as yet enforced by law—ships generally carry a white light astern showing for 6 points (67.°5) on either side from astern, this light, in conjunction with the side-lights, constitutes an extremely efficient safeguard for a ship overtaking another.

Without detracting anything from the nature of the invention modifications may be carried out within the scope of the claims. The luminous shanks may thus be given the shape of a declining capital T, see Fig. XV, where the stem of the T is the horizontal and the cross-piece the vertical shank. The screen behind the vertical shank would then seem most appropriately shaped as shown in Fig. XVI.

Spot-lights may also be used as hitherto except that by their number, by reflectors or otherwise they are given the appearance of elongated lights.

Having now particularly described the nature of my invention and the manner of its operation what I claim is:

1. Side-lights for marine and air craft consisting of a source of light in the shape of an anterior vertical elongated shank, and a second source of light in the shape of a posterior horizontal elongated shank disposed parallel with the fore and aft center line of the craft, and a screen fitted alongside and behind said vertical shank in such manner that when viewed by degrees from ahead to abeam, the vertical light alone is at first seen, then besides the vertical light, a gradually lengthening horizontal light, and finally a gradually diminishing width of the vertical light under continued lengthening of the horizontal light.

2. Side-lights for marine and air craft consisting of a source of light in the shape of an anterior vertical elongated shank, and a second source of light in the shape of a posterior horizontal elongated shank, disposed parallel with the fore and aft center line of the craft, the length of said vertical shank being substantially 71% of that of the horizontal shank.

CARL JOHAN FREDRIK WESTMAN.